United States Patent
Toda et al.

(10) Patent No.: US 11,825,017 B2
(45) Date of Patent: Nov. 21, 2023

(54) CALL CONTROL APPARATUS, CALL PROCESSING CONTINUATION METHOD AND CALL CONTROL PROGRAM

(71) Applicant: Nippon Telegraph and Telephone Corporation, Tokyo (JP)

(72) Inventors: Takato Toda, Musashino (JP); Nobuhiro Kimura, Musashino (JP); Minoru Sakuma, Musashino (JP); Kotaro Mihara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/800,158

(22) PCT Filed: Feb. 21, 2020

(86) PCT No.: PCT/JP2020/007116
§ 371 (c)(1),
(2) Date: Aug. 16, 2022

(87) PCT Pub. No.: WO2021/166229
PCT Pub. Date: Aug. 26, 2021

(65) Prior Publication Data
US 2023/0075573 A1    Mar. 9, 2023

(51) Int. Cl.
*H04M 3/22* (2006.01)
*H04M 3/24* (2006.01)
*H04M 11/04* (2006.01)

(52) U.S. Cl.
CPC ............ *H04M 3/2254* (2013.01); *H04M 3/24* (2013.01); *H04M 11/04* (2013.01)

(58) Field of Classification Search
CPC .............................. H04M 3/2254; H04M 3/24
See application file for complete search history.

(56) References Cited

U.S. PATENT DOCUMENTS

| | | | | |
|---|---|---|---|---|
| 2015/0295792 A1* | 10/2015 | Cropper | .................. | H04L 67/10 709/226 |
| 2016/0048408 A1* | 2/2016 | Madhu | .................. | H04L 47/783 718/1 |

(Continued)

FOREIGN PATENT DOCUMENTS

| | | | | |
|---|---|---|---|---|
| JP | 20166614 | * | 1/2016 | .......... H04M 3/2254 |
| JP | 2016006614 | | 1/2016 | |
| JP | 2017027166 | | 2/2017 | |

OTHER PUBLICATIONS

Kawaguchi et al., "Evaluation on Application of Virtualization Technology to SIP Server," IEICE Technical Report, 2017, 117(131):1-6, 13 pages (with English Translation).

(Continued)

*Primary Examiner* — Maria El-Zoobi
(74) *Attorney, Agent, or Firm* — Fish & Richardson P.C.

(57) ABSTRACT

An IA server includes a plurality of execution units that execute respective virtual machines of a plurality of disaster recovery stations corresponding one-to-one to a plurality of active stations. The plurality of disaster recovery stations includes a virtualized call control server that performs call processing when an active station is not operating, and a control unit that controls an operation of the virtual machines. The control unit activates, at normal times, the virtual machines, and deactivates, when any active station of the plurality of active stations is not operating, a virtual machine of a disaster recovery station of the plurality of disaster recovery stations other than a virtual machine of a disaster recovery station of the plurality of disaster recovery stations corresponding to the active station not operating, and operates only the virtual machine of the disaster recovery station corresponding to the active station not operating.

5 Claims, 13 Drawing Sheets

AT NORMAL TIMES        AT ACT SYSTEM MALFUNCTION

··· CALL CONTROL SERVER
(SBC: SingleBoardComputer)

(56) References Cited

U.S. PATENT DOCUMENTS

2018/0150365 A1* 5/2018 Cors ............... G06F 11/2025
2021/0209536 A1* 7/2021 Reuveni ........... G06Q 10/06316

OTHER PUBLICATIONS

Oto et al., "Application of virtualization technology in communication networks," NTT Docomo Technical Journal, 2016, 24(1):6-11, 13 pages (with English Translation).

* cited by examiner

CALL CONTROL APPARATUS, CALL PROCESSING CONTINUATION METHOD AND CALL CONTROL PROGRAM

CROSS-REFERENCE TO RELATED APPLICATIONS

This application is a National Stage application under 35 U.S.C. § 371 of International Application No. PCT/JP2020/007116, having an International Filing Date of Feb. 21, 2020. The disclosure of the prior application is considered part of the disclosure of this application, and is incorporated by reference in its entirety into this application.

TECHNICAL FIELD

The present invention relates to a call control apparatus, a call processing continuation method, and a call control program.

BACKGROUND ART

Call control servers are required to be highly available at all times.

So far, such a call control server is constructed of exclusively developed hardware and software, as in a single board computer (SBC) and a server complying with the advanced telecom computing architecture (ATCA) standard. Further, due to operational limits and system changes, application of the call control server to general-purpose hardware such as Intel architecture (IA) servers, and application of a virtualization technology or a network functions virtualization (NFV) technology are being studied (see NPLs 1 and 2).

CITATION LIST

Non Patent Literature

NPL 1: Kawaguchi and three others, "Evaluation on Application of Virtualization Technology to SIP Server" IEICE Technical Report, vol. 117, no. 131, NS2017-70, July 2017, p. 211-p. 216

NPL 2: "Network Functions Virtualization (NFV), Point 3", NTT docomo, [Searched on Feb. 14, 2020], Internet <URL: https://www.nttdocomo.co.jp/corporate/technology/rd/lecture/nfv/>

SUMMARY OF THE INVENTION

Technical Problem

An existing call processing continuation method will be described for high availability.

There is a method using a cluster configuration including an ACT system (in operation) call control server and an SBY system (standby) call control server. When the ACT system call control server malfunctions, the SBY system call control server takes over call processing, so that a call control service can be continuously provided (see FIG. 1).

There is a "disaster recovery method" in which a plurality of sets of two call control servers in the cluster configuration are accumulated so that the "disaster recovery method" is executed on a station-by-station basis. For example, a plurality of sets of two call control servers are accumulated and installed at a predetermined location, and the plurality of sets of two call control servers are operated as an active station providing a call control service at normal times. Meanwhile, a station obtained by duplicating the active station is installed at a location several tens of kilometers away from the active station and takes over the call processing as a disaster recovery station in a case where the active station malfunctions or is affected by a disaster so that the call control service can be continuously provided in each station. One disaster recovery station exists correspondingly to one active station, and N sets of one disaster recovery station and one active station are installed, and thus, this method is called an "N:N disaster recovery method" (see FIGS. 2 and 3).

In the case of the "N:N disaster recovery method", a file server #2 of the disaster recovery station instructs a file server #1 of the active station to collect data such as operation data, and after receiving a notification of a data collection result from each call control server of the active station, from the file server #1 of the active station, the file server #2 collects the data from the file server #1 of the active station and transfers the collected data to each call control server of the disaster recovery station (see FIG. 4). In the "N:N disaster recovery method", such processing for transferring data of backup files is performed once an hour. When the active station is affected by a disaster, every call control server of the disaster recovery station corresponding to the active station affected by a disaster reflects, in a memory, data required for continuing call processing among the transferred data, in response to a command input by a maintenance person, to start an operation.

There is also an "N:1 disaster recovery method" in which one disaster recovery station exists for N number of active stations. For example, two active call control servers A1 and A2 corresponding to the N number of active stations and one extra call control server A0 corresponding to the one disaster recovery station are installed in one station A. Two stations B and C having the same configuration as the station A are further installed. That is, each of the stations A, B, and C holds an extra call control server (see FIG. 5).

In the case of the "N:1 disaster recovery method", at normal times, one backup server periodically collects a file on a previous day (LAF file) from active call control servers A1, A2, B1, B2, C1, and C2. If a station is affected by a disaster, the backup server transfers a backup file of the station affected by a disaster (for example, backup files of B1 and B2) to an extra call control server (for example, A0 and C0) included in an unaffected station, renews the network (for example, blocks a communication route to the station affected by a disaster, or newly installs, tests, and confirms communication routes to the new call control servers B1 and B2), and then, starts an operation of the network.

In the above "disaster recovery method", in the case of the "N:N disaster recovery method", the backup file is transferred to the disaster recovery station once an hour, and thus, a recovery time after being affected by a disaster is short, and the reliability for continuing the call control service is high. However, a disaster recovery station is constructed for every active station, and thus, a capital expenditure (CAPEX) and an operating expense (OPEX) increase. On the other hand, in the case of the "N:1 disaster recovery method", one extra call control server (z one disaster recovery station) is constructed for a plurality of active call control servers (~ a plurality of active stations), and thus, it is possible to reduce the capital expenditure and the operating expense. However, the backup file is transferred to the extra call control server at a timing where the active station is affected by a disaster, and thus, a recovery time after being affected by a disaster is long.

The present invention has been made in view of the above circumstances, and an object of the present invention is to provide a technique by which it is possible to reduce an equipment cost and an operating expense of a disaster recovery station in a "disaster recovery method".

Means for Solving the Problem

A call control apparatus according to one aspect of the present invention that operates as an extra call control apparatus inside of one hardware apparatus includes a plurality of execution units that execute respective virtual machines of a plurality of disaster recovery stations corresponding one-to-one to a plurality of active stations including a call control server that performs call processing at normal times, the plurality of disaster recovery stations including a virtualized call control server that performs call processing when an active station of the plurality of active stations is not operating, and a control unit that controls an operation of the virtual machines of the plurality of disaster recovery stations. The control unit activates, at normal times, the virtual machines of the plurality of disaster recovery stations corresponding one-to-one to the plurality of active stations inside of the one hardware apparatus, deactivates, when any active station of the plurality of active stations is not operating, a virtual machine of a disaster recovery station of the plurality of disaster recovery stations other than a virtual machine of a disaster recovery station of the plurality of disaster recovery stations corresponding to the active station not operating, and operates only the virtual machine of the disaster recovery station corresponding to the active station not operating. At normal times, each of the virtual machines of the plurality of disaster recovery stations repeatedly receives data related to call processing from a corresponding active station of the plurality of active stations at a predetermined timing.

A call processing continuation method according to one aspect of the present invention is performed by an extra call control apparatus that operates inside of one hardware apparatus, and the extra call control apparatus includes a plurality of execution units that execute virtual machines of a plurality of disaster recovery stations corresponding one-to-one to a plurality of active stations including a call control server that performs call processing at normal times, the plurality of disaster recovery stations including a virtualized call control server that performs call processing when an active station of the plurality of active stations is not operating, and a control unit that controls an operation of the virtual machines of the plurality of disaster recovery stations. The call processing continuation method includes activating, at normal times, by the control unit, the virtual machines of the plurality of disaster recovery stations corresponding one-to-one to the plurality of active stations inside of the one hardware apparatus, repeatedly receiving, at normal times, by each of the virtual machines of the plurality of disaster recovery stations, data related to call processing from a corresponding active station of the plurality of active stations at a predetermined timing, and deactivating, by the control unit, when any active station of the plurality of active stations is not operating, a virtual machine of a disaster recovery station of the plurality of disaster recovery stations other than a virtual machine of a disaster recovery station of the plurality of disaster recovery stations corresponding to the active station not operating, and operating only the virtual machine of the disaster recovery station corresponding to the active station not operating.

A call control program according to one aspect of the present invention is a call control program causing a computer to function as the call control apparatus.

Effects of the Invention

According to the present invention, it is possible to provide a technique by which it is possible to reduce an equipment cost and an operating expense of a disaster recovery station in a "disaster recovery method".

DESCRIPTION OF EMBODIMENTS

Figure 1:
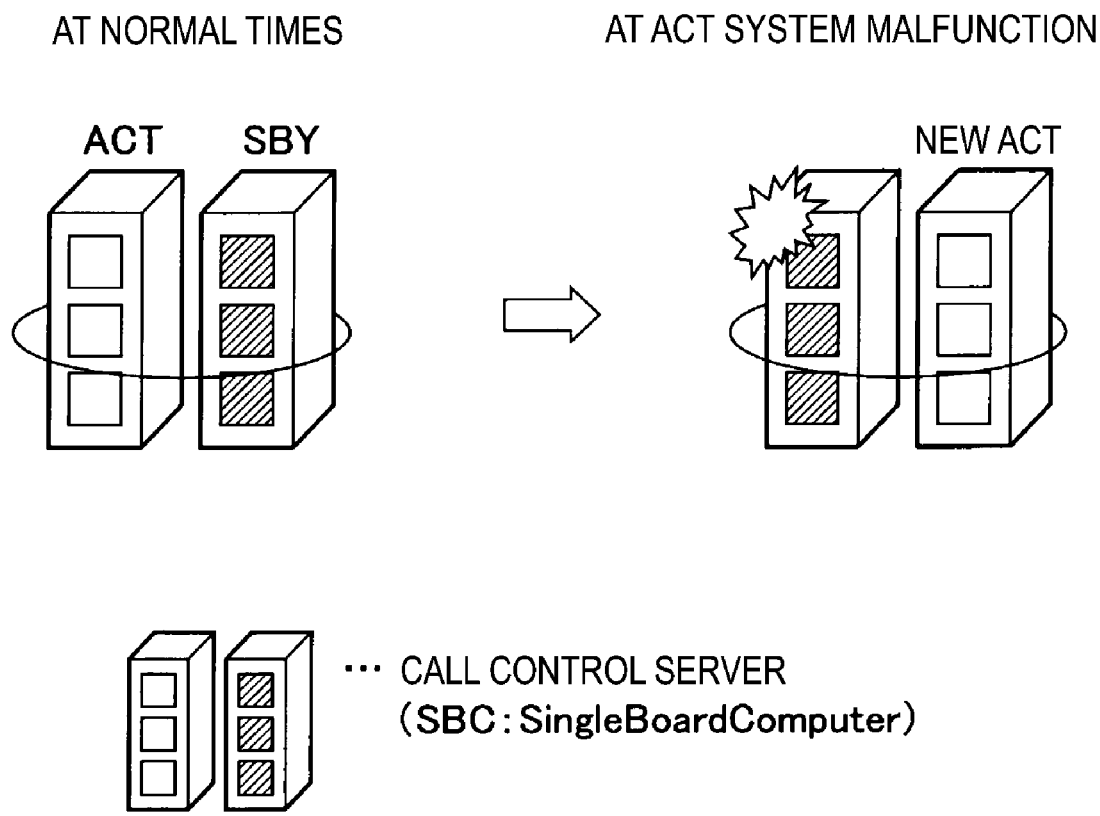
FIG. 1 is a diagram illustrating an example of a cluster configuration method.
Figure 2:
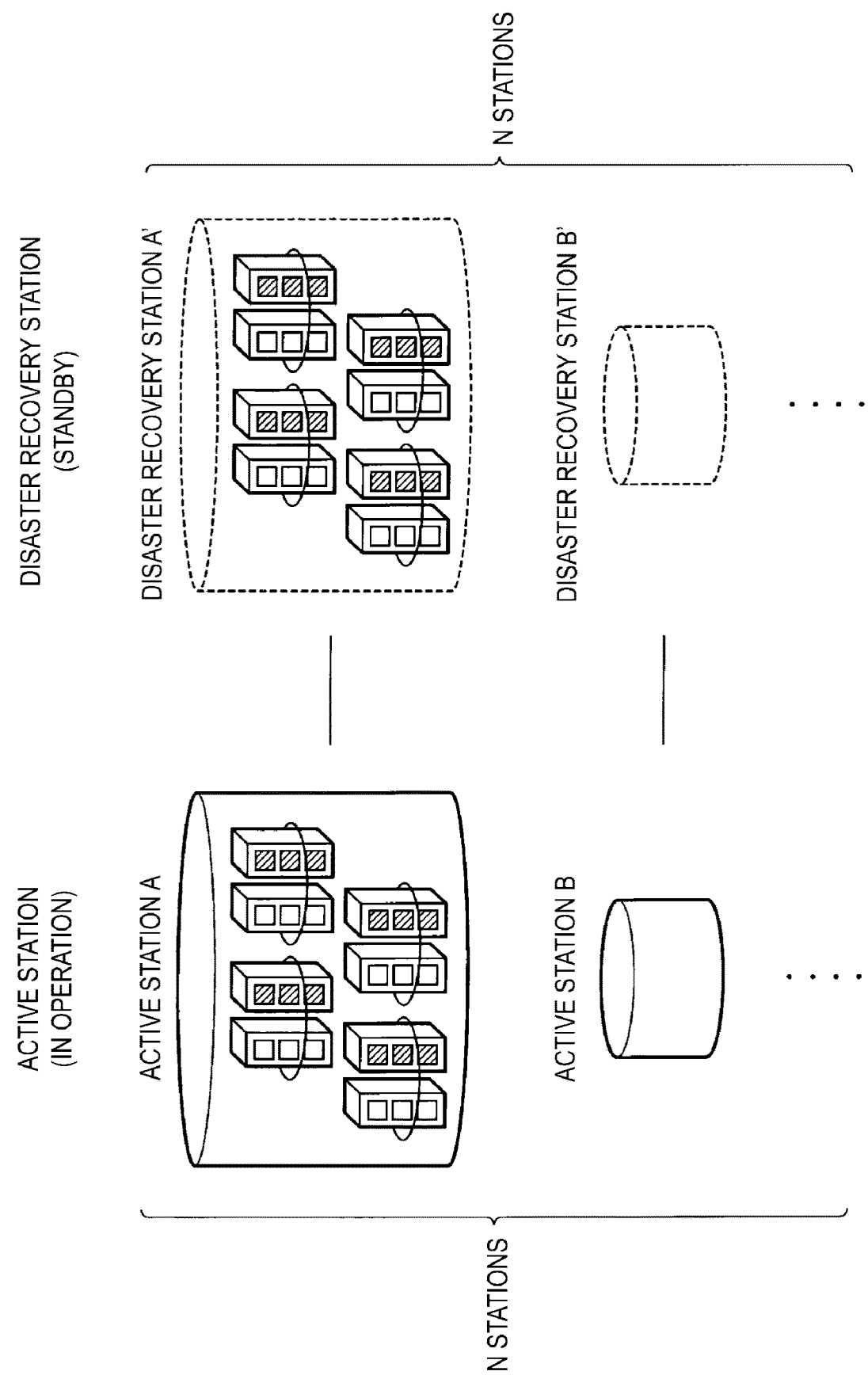
FIG. 2 is a diagram illustrating an example of an N:N disaster recovery method.
Figure 3:
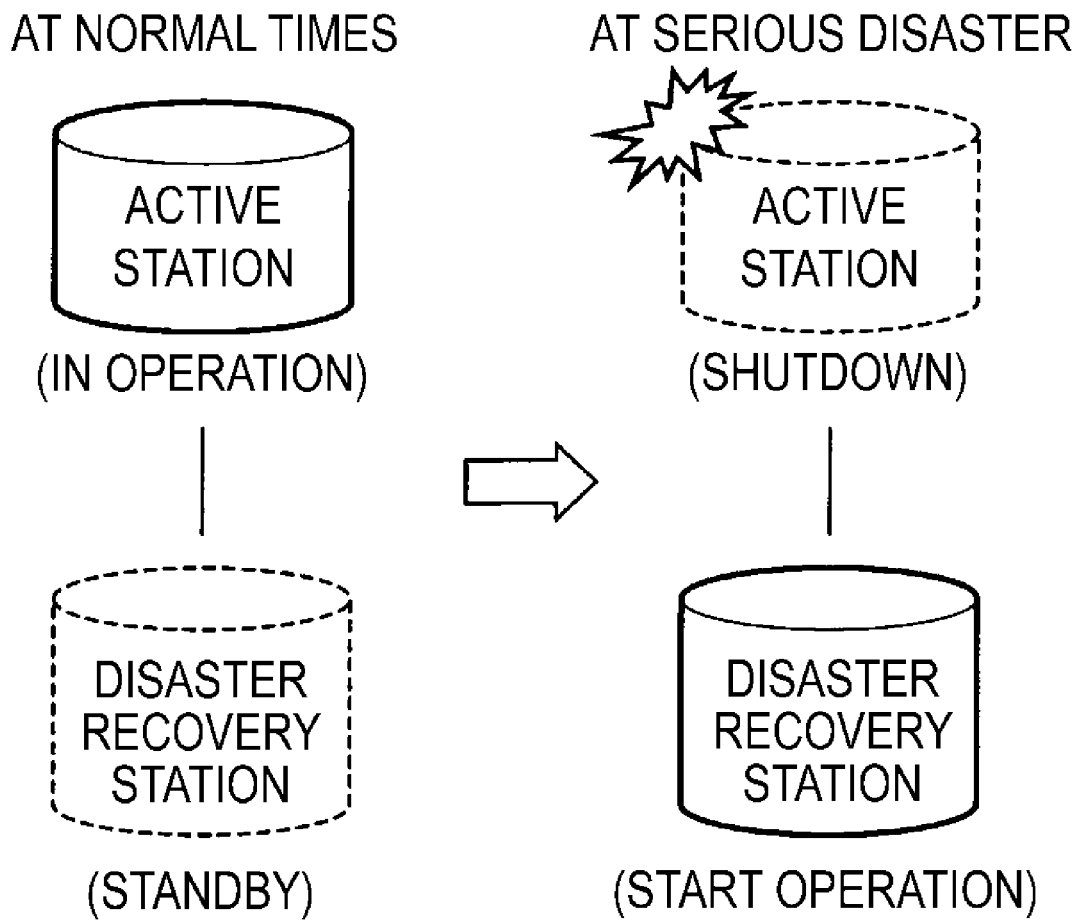
FIG. 3 is a diagram illustrating an example of the N:N disaster recovery method.
Figure 4:
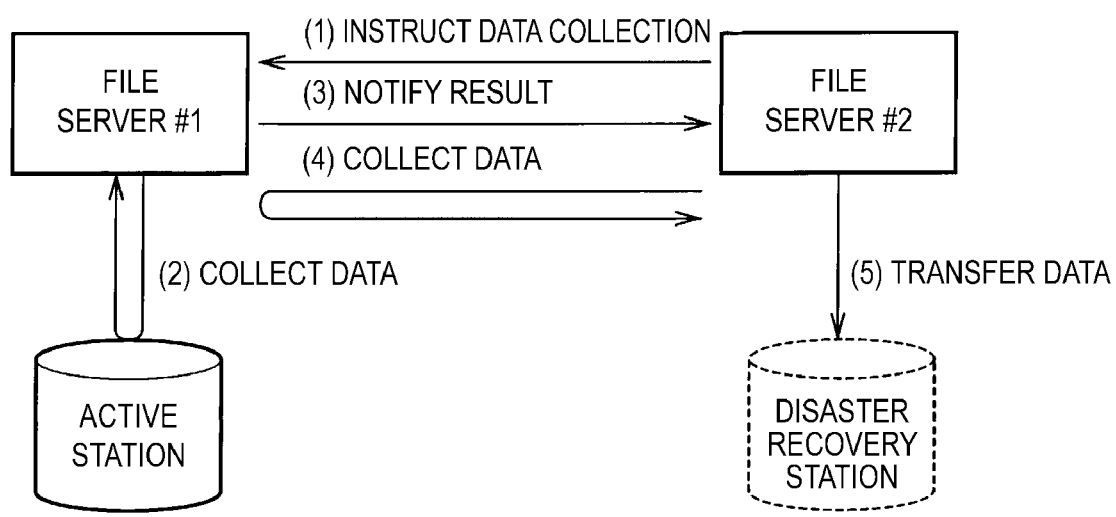
FIG. 4 is a diagram illustrating an example of the N:N disaster recovery method.
Figure 5:
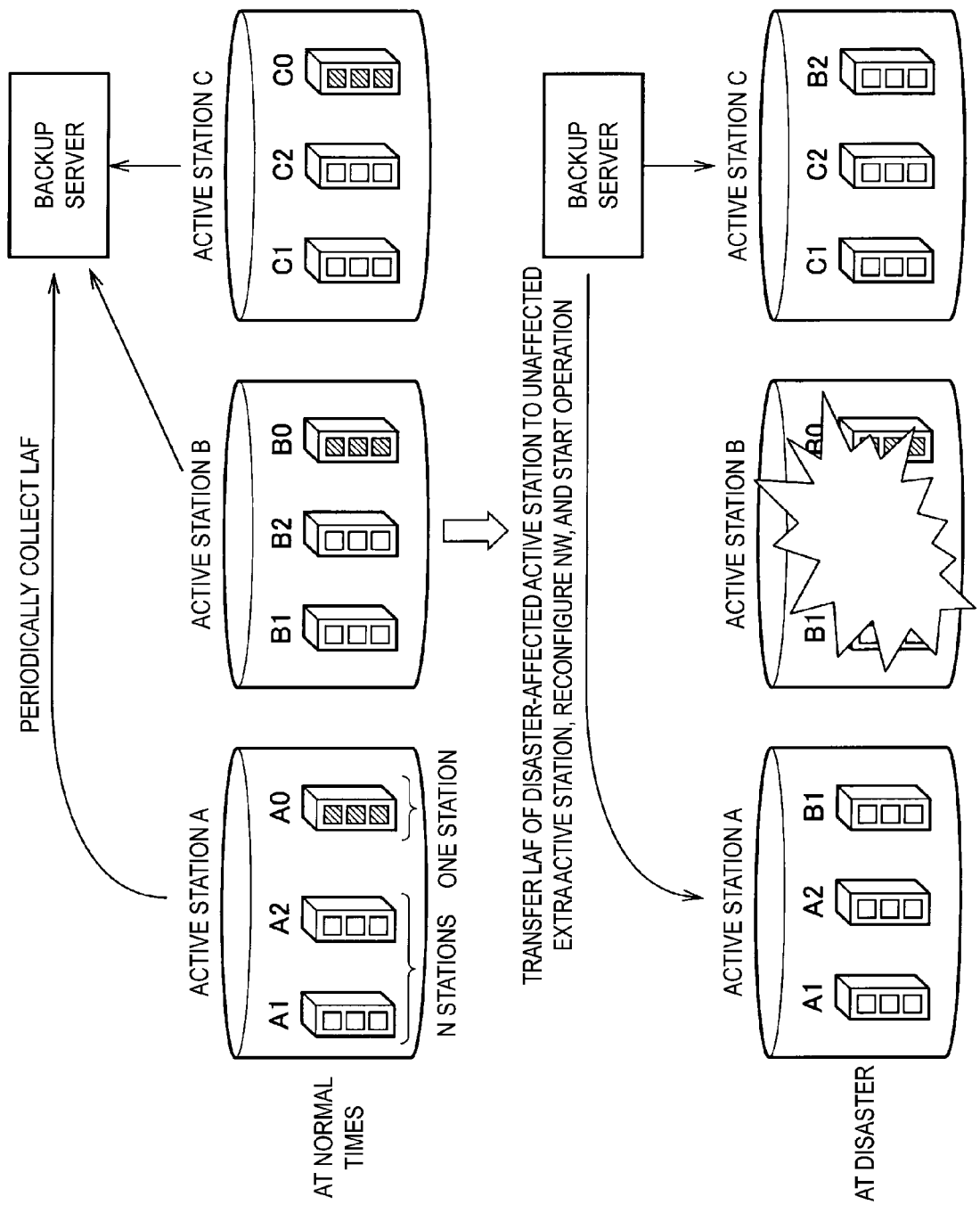
FIG. 5 is a diagram illustrating an example of an N:1 disaster recovery method.

Hereinafter, an embodiment of the present invention will be described with reference to the drawings. Note that the same portions in the description of the drawings will be denoted by the same reference numerals and signs, and the description thereof will be omitted.

1. Summary of the Invention

In the present invention, a virtualization technology or an NFV technology is used to virtualize a call control server of a disaster recovery station, to provide a technique by which it is possible to reduce an equipment cost and an operating expense of the disaster recovery station in a "disaster recovery method". In addition, in the present invention, virtual machines of a plurality of disaster recovery stations with low specifications respectively corresponding to a plurality of active stations (virtual machines (VMs) of disaster recovery stations including virtualized call control servers, hereinafter, referred to as disaster recovery station VMs) are activated inside of one hardware apparatus at normal times. Each of the plurality of activated disaster recovery station VMs repeatedly receives, at a predetermined timing, data related to call processing from an active station corresponding to the activated disaster recovery station VMs. In addition, in the present invention, when an active station is not operating, a disaster recovery station VM other than a disaster recovery station VM corresponding to the non-operating active station is deactivated, and only the disaster recovery station VM corresponding to the non-operating active station is operated.

In the present invention, the plurality of disaster recovery station VMs respectively corresponding to the plurality of active stations are activated, and each of the plurality of activated disaster recovery station VMs repeatedly receives, at a predetermined timing, data related to call processing from an active station corresponding to the activated disaster recovery station VM, and thus, it is possible to maintain a recovery time similar to that in an "N:N disaster recovery method" know in the art. In addition, in the present invention, the plurality of disaster recovery station VMs are activated inside of one hardware apparatus, a disaster recovery station VM other than a disaster recovery station VM corresponding to a non-operating active station is deactivated when the active station is not operating, and only the disaster recovery station VM corresponding to the non-operating active station is operated, and thus, a required resource amount can be reduced to a resource amount equivalent to that in an "N:1 disaster recovery method".

2. Configuration of Call Control System

Figure 6:
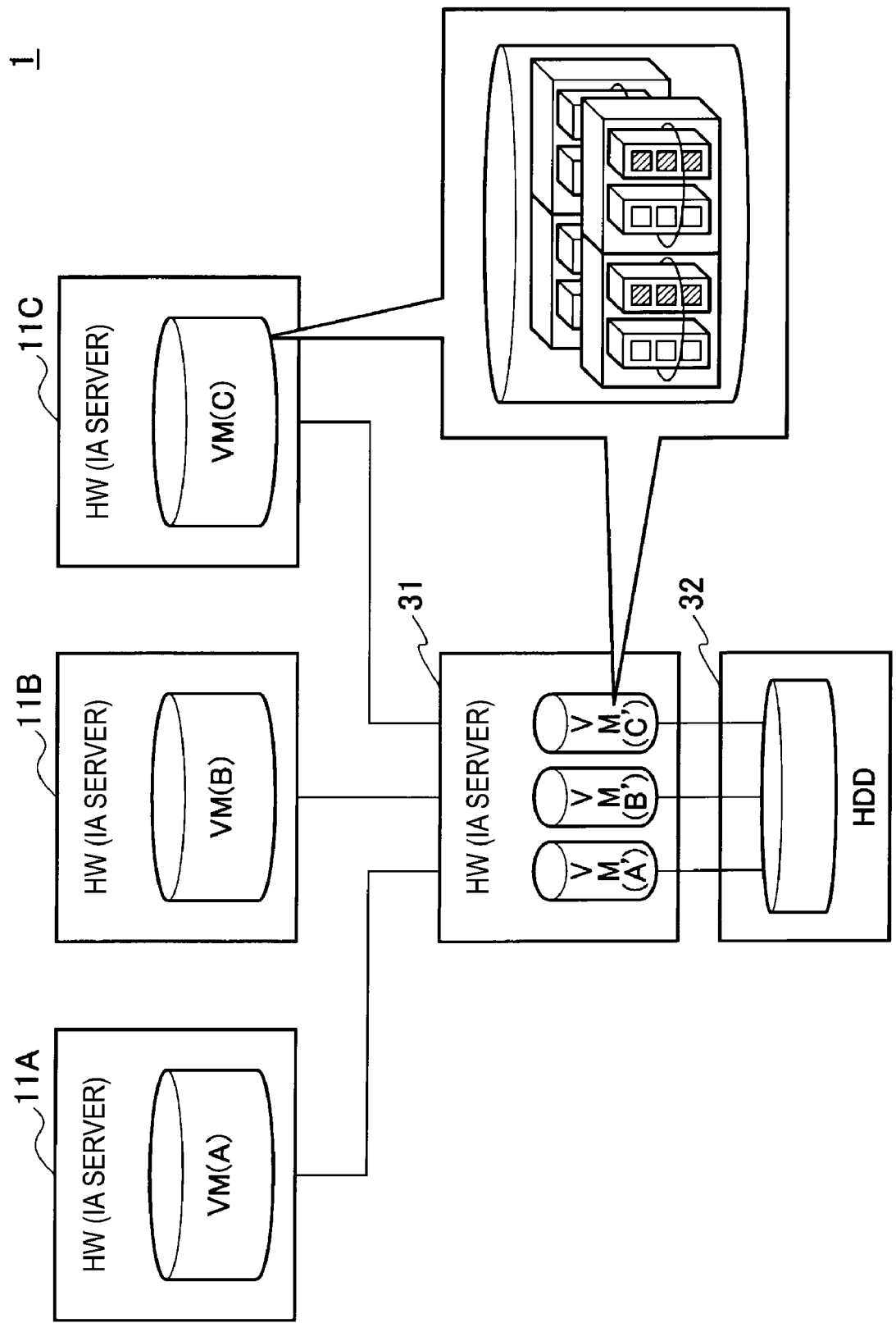
FIG. 6 is a diagram illustrating a configuration of a call control system.

FIG. 6 is a diagram illustrating a configuration of a call control system 1 according to the present embodiment. The call control system 1 uses the same type of four IA servers. Of the four IA servers, three IA servers 11A to 1 IC are used as active stations, and an IA server 31 being the remaining one of the four IA servers is used as a disaster recovery station.

The IA servers 11A to 11C are installed at locations geographically different from each other and execute active station VM (A) to VM (C) including a plurality of virtualized call control servers that performs call processing at normal times. The active station VM (A) to VM (C) each include a plurality of pairs of call control servers in a cluster configuration including a virtualized ACT system call control server and a virtualized SBY system call control server. A rectangular block surrounding a pair of call control servers illustrated at the lower right of FIG. 6 provides an image of a virtualized state. Instead of the virtualized call control server, the active station may include a well-known call control server constructed of exclusively developed hardware, such as an SBC and a server complying with the ATCA standard. The call control server may be virtualized by the well-known techniques of NPL 1 and 2.

The IA server 31 executes three disaster recovery station VM (A') to VM (C') corresponding to the three active station VM (A) to VM (C) mentioned above. The disaster recovery station VM (A') to VM (C') also each include a plurality of pairs of call control servers in a cluster configuration including a virtualized ACT system call control server and a virtualized SBY system call control server. Note that an external disk 32 is connected to the IA server 31 in preparation for a situation where the storage capacity of the IA server 31 is not sufficient for an amount of data transferred from the active station VM (A) to VM (C).

Figure 7:
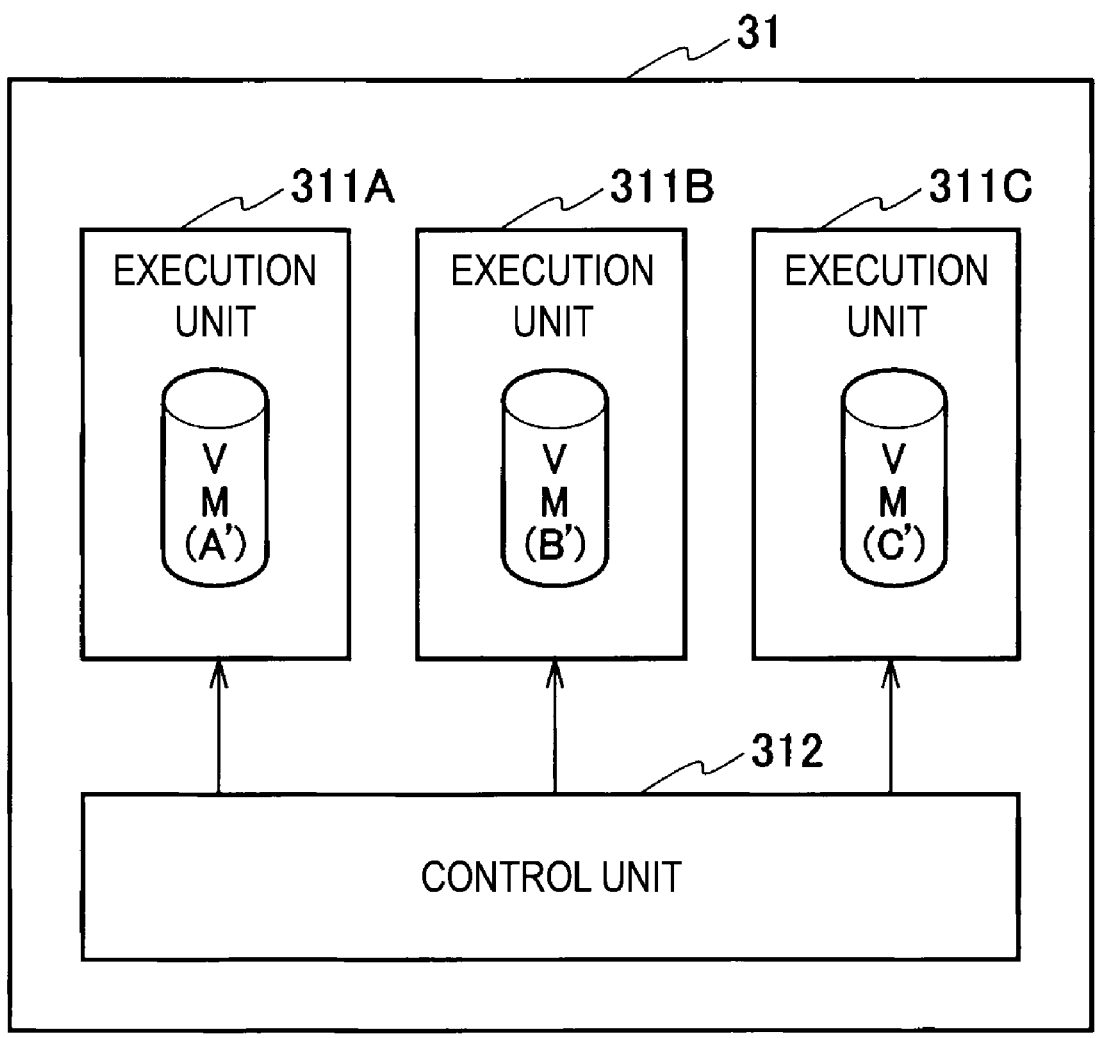
FIG. 7 is a diagram illustrating an exemplary configuration of an extra call control apparatus.

FIG. 7 is a diagram illustrating a configuration of the IA server 31. The IA server 31 is an extra call control apparatus for operating the three disaster recovery station VM (A') to VM (C') inside of the one IA server 31 and includes three execution units 311A to 311C and one control unit 312.

The execution units 311A to 311C have a function for executing each of the three disaster recovery station VM (A') to VM (C') including a plurality of virtualized call control servers that performs call processing when an active station is not operating, the three disaster recovery station VM (A') to VM (C') corresponding to each of the three active station VM (A) to VM (C) including a plurality of virtualized call control servers that performs call processing at normal times. The disaster recovery station VM (A') to VM (C') activated by the execution each repeatedly receive, at normal times, data related to call processing from each of the active station VM (A) to VM (C) corresponding to the activated disaster recovery station VM (A') to VM (C') at a predetermined timing.

The control unit 312 has a function for controlling an operation of the execution units 311A to 311C, an operation of the three disaster recovery station VM (A') to VM (C'), and resource of the IA server 31.

The control unit 312 has a function for activating the three disaster recovery station VM (A') to VM (C') corresponding to the three active station VM (A) to VM (C) inside of one hardware apparatus (that is, the IA server 31) at normal times, when any one active station VM of the three active station (A) to VM (C) is not operating, deactivating a disaster recovery station VM other than a disaster recovery station VM corresponding to the non-operating active station VM, and operating only the disaster recovery station VM corresponding to the non-operating active station VM.

In addition, the control unit 312 has a function for allocating a predetermined amount of available resource to each of the three disaster recovery station VM (A') to VM (C') at normal times, releasing the amount of available resource allocated to the disaster recovery station VM other than the disaster recovery station VM corresponding to the non-operating active station VM when the active station VM is not operating, and increasing the amount of available resource allocated to the disaster recovery station VM corresponding to the non-operating active station.

The extra call control apparatus operating on the IA server 31 may be constructed by using, for example, the European Telecommunications Standards Institute (ETSI) NFV architecture defined by the ETSI. The execution units 311A to 311C may be realized by using a virtual network function (VNF). The control unit 312 may be realized by using a VNF manager (VNFM) that monitors and controls the VNF.

3. Operation of IA Server 31 (Call Control Apparatus)

Figure 8:
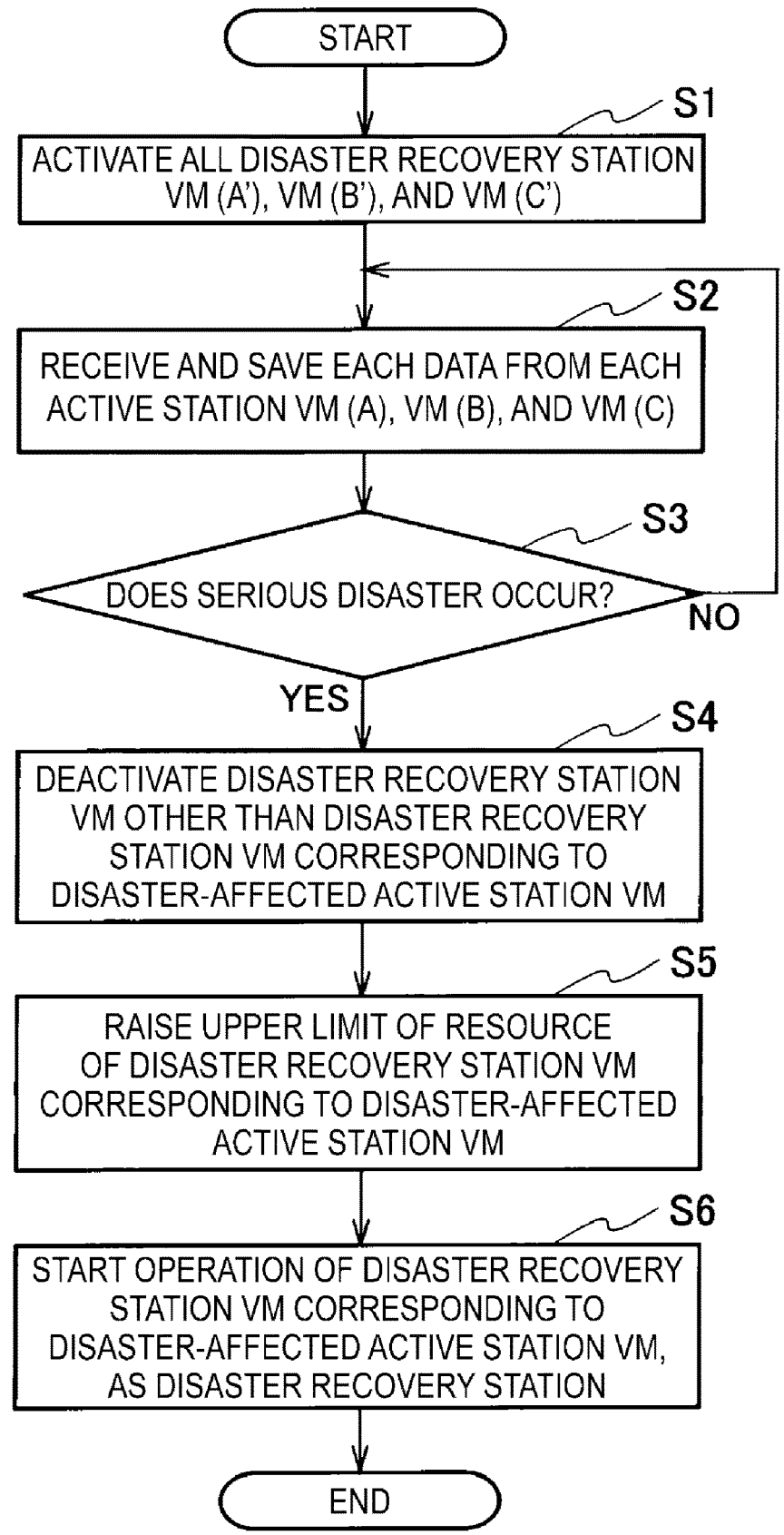
FIG. 8 is a diagram illustrating an example of a processing flow of a call processing continuation method.

FIG. 8 is a diagram illustrating a processing flow of a call processing continuation method performed by the IA server 31 (the call control apparatus).

Step S1;

first, at normal times, the control unit 312 activates all of the three disaster recovery station VM (A') to VM (C') corresponding to the three active station VM (A) to VM (C) inside of one hardware apparatus (that is, the IA server 31) and allocates 30% of CPU usage rate and 30% of the available memory amount to each of the three activated disaster recovery station VM (A') to VM (C').

Figure 9:
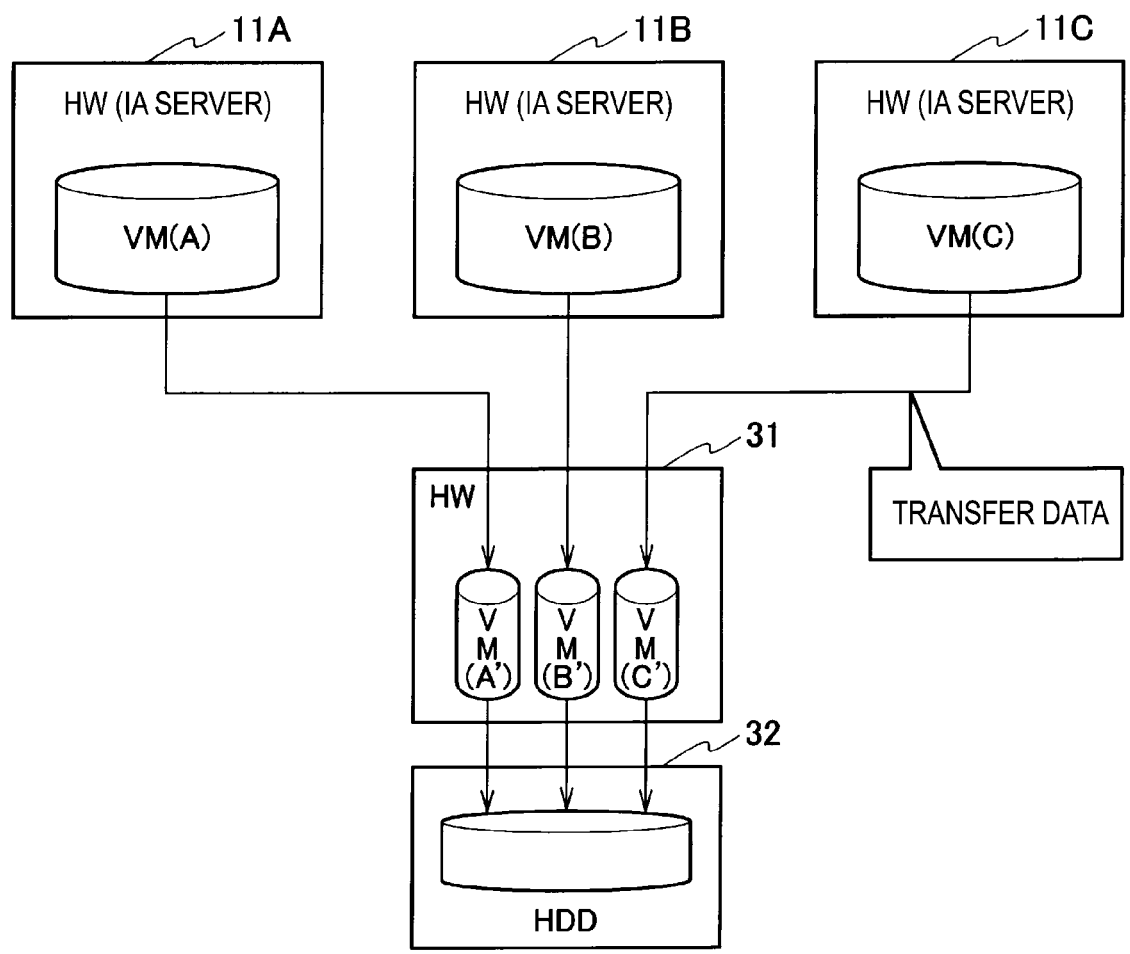
FIG. 9 is a diagram illustrating an example of data transfer at normal times.

Step S2;

next, all of the three activated disaster recovery station VM (A') to VM (C') repeatedly acquire, periodically once an hour, data related to call processing from the active station VM (A) to VM (C) corresponding to the disaster recovery station VM (A') to VM (C') (for example, operation data such as call control data, and voice data) and save the acquired data as a backup file in a storage of the IA server 31. When the storage capacity of the IA server 31 is insufficient, the disaster recovery station VM (A') to VM (C') save the acquired backup file on the external disk 32 (see FIG. 9).

Step S3;

subsequently, the control unit 312 determines whether or not a serious disaster occurs. For example, when a maintenance person inputs a command indicating occurrence of a serious disaster, the control unit 312 determines that the serious disaster occurs. In addition, when there is no response from both the ACT system call control server and the SBY system call control server constituting the active station VM within a predetermined period, the control unit 312 may autonomously determine that a serious disaster occurs at the active station VM. When no serious disaster occurs, the control unit 312 returns to step S2. When a serious disaster occurs, the control unit 312 proceeds to step S4.

Figure 10:
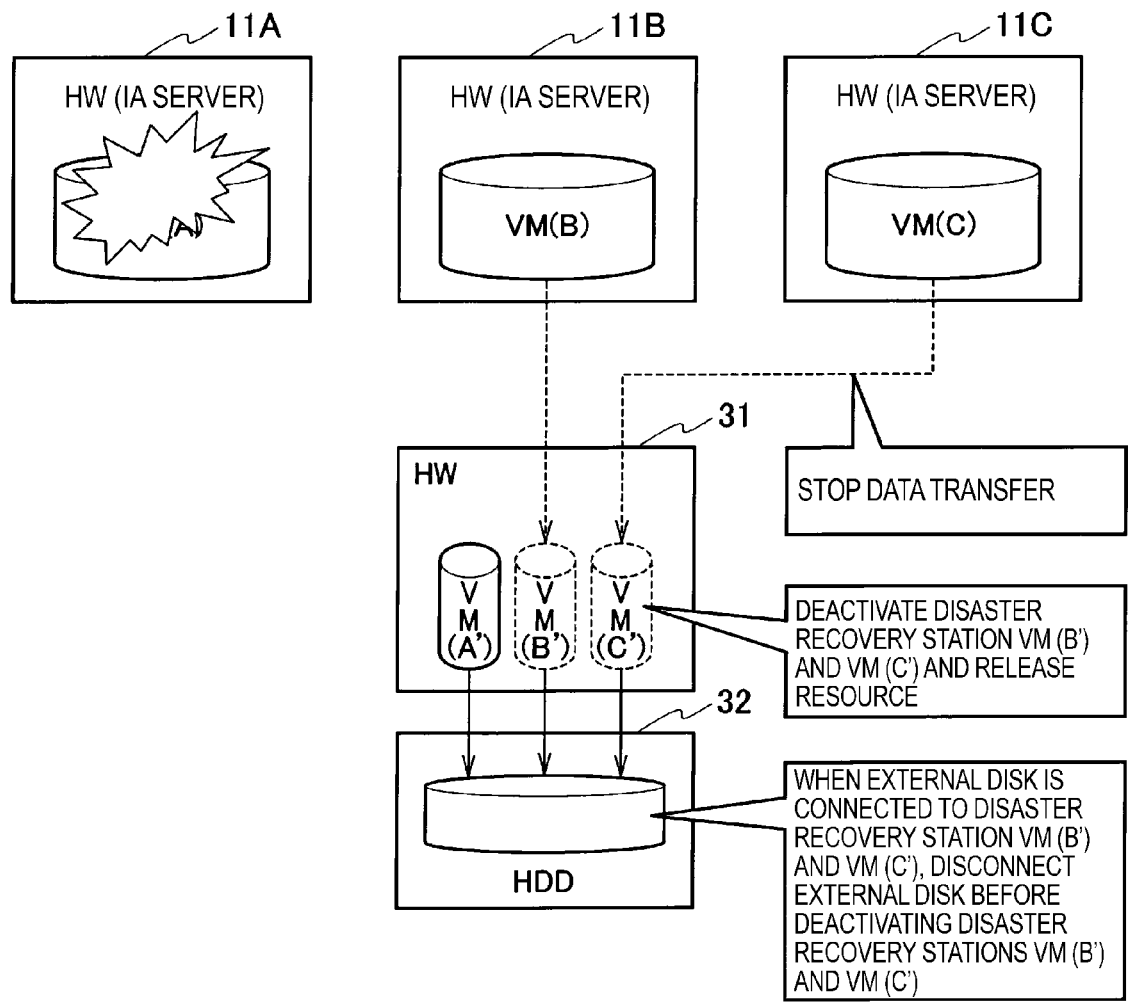
FIG. 10 is a diagram illustrating an operation example of a disaster recovery station during a serious disaster.

Step S4;

next, the control unit 312 deactivates a disaster recovery station VM other than a disaster recovery station VM corresponding to the active station VM not operating due to the occurrence of the serious disaster and operates only the disaster recovery station VM corresponding to the non-operating active station VM. For example, when all of the call control servers constituting the active station VM (A) are not operating, the control unit 312 instructs the disaster recovery station VM (B') and the disaster recovery station VM (C') to stop data acquisition, deactivates the disaster recovery station VM (B') and the disaster recovery station VM (C'), and operates only the disaster recovery station VM (A'). Furthermore, the control unit 312 releases an amount of available resource allocated to the disaster recovery station VM (B') and the disaster recovery station VM (C'). If the disaster recovery station VM (B') or the disaster recovery station VM (C') uses the external disk 32, the control unit 312 disconnects the disaster recovery station VM (B') or the disaster recovery station VM (C') from the external disk 32 before deactivating the disaster recovery station VM (B') or the disaster recovery station VM (C') (see FIG. 10).

Figure 11:
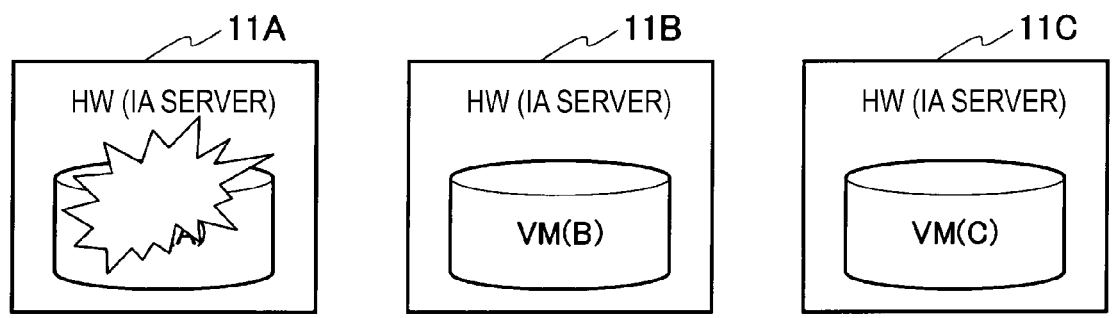
FIG. 11 is a diagram illustrating an operation example of the disaster recovery station during a serious disaster.
Figure 11:
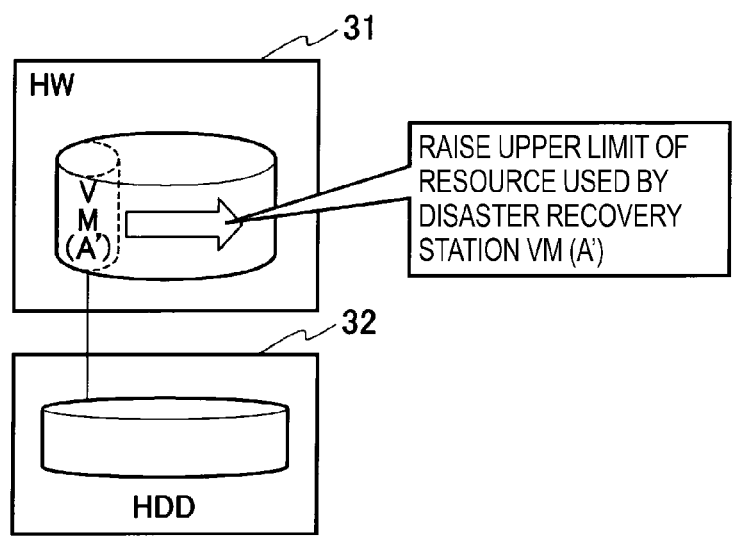

Step S5;

next, the control unit 312 raises an upper limit of the amount of available resource allocated to the disaster recovery station VM (A') corresponding to the non-operating active station VM (A) (see FIG. 11). For example, the control unit 312 changes the CPU usage rate allocated to the disaster recovery station VM (A') from 30% to 90%. As for a method of changing the amount of available resource, if flavors provided by Openstack are changed, it is possible to change resources available to the VM, such as a disk capacity, the number of CPU cores, and a memory capacity.

Figure 12:
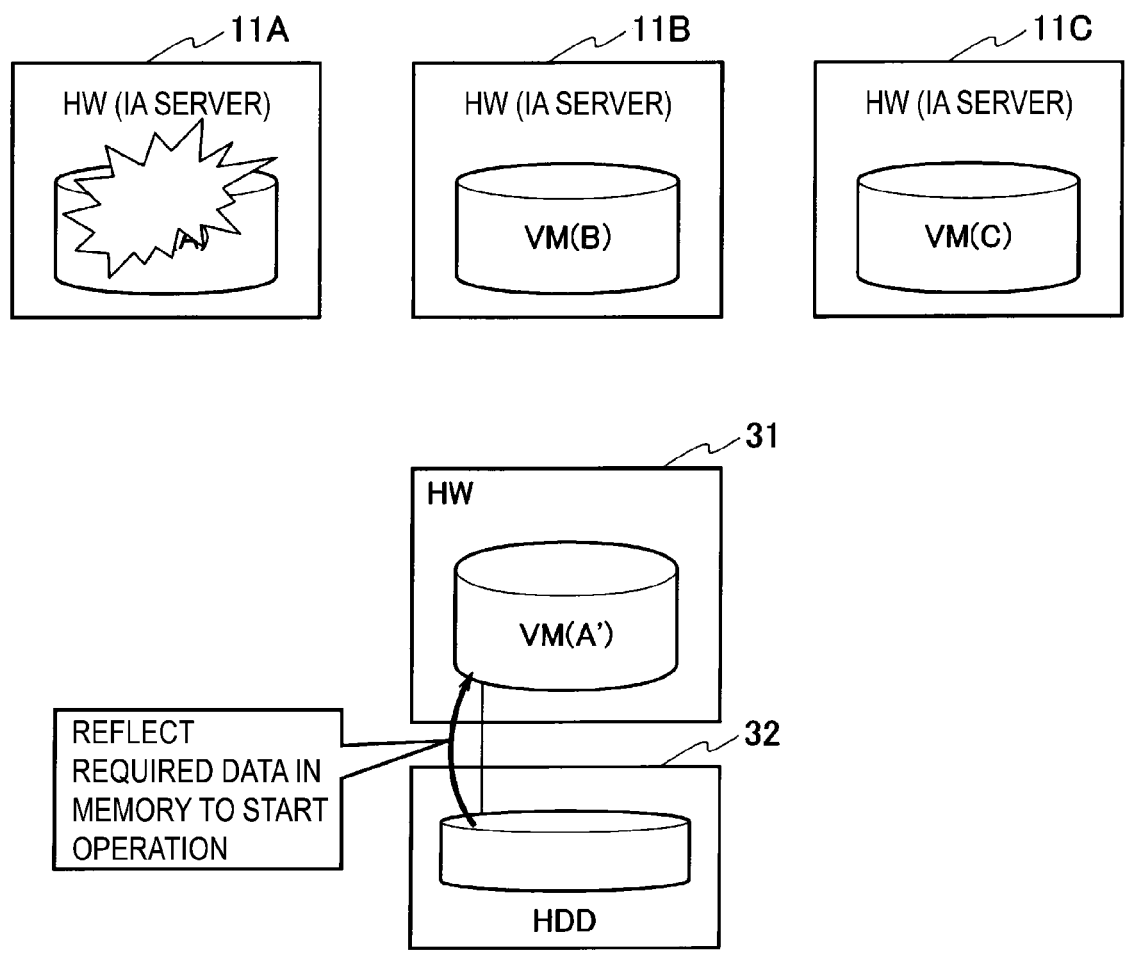
FIG. 12 is a diagram illustrating an operation example of the disaster recovery station during a serious disaster.

Step S6;

finally, the disaster recovery station VM (A') having the raised upper limit of the amount of available resource reflects, in the memory, necessary data among data transferred to the disaster recovery station VM (A') before the occurrence of the serious disaster and starts an operation as the disaster recovery station VM (A') (see FIG. 12).

4. Effects

According to the present embodiment, the control unit 312 activates the three disaster recovery station VM (A') to VM (C') respectively corresponding to the three active station VM (A) to VM (C) inside of one hardware apparatus (that is, the IA server 31) at normal times, and when any one active station VM of the three active station VM (A) to VM (C) is not operating, deactivates a disaster recovery station VM other than a disaster recovery station VM corresponding to the non-operating active station VM, and operates only the disaster recovery station VM corresponding to the non-operating active station VM. Each of the three disaster recovery station VM (A') to VM (C') repeatedly receives, at normal times, data related to call processing from a corresponding active station of the three active station VM (A) to VM (C) at a predetermined timing, and thus, a recovery time similar to that in the "N:N disaster recovery method" known in the art can be maintained, and a required resource amount can be reduced to a resource amount equivalent to that in the "N:1 disaster recovery method". Consequently, it is possible to provide a technique by which it is possible to reduce an equipment cost and an operating expense of a disaster recovery station in a "disaster recovery method".

5. Modifications

In the present embodiment, a case where the number of the active station VMs is three is described in an example. However, the number of the active station VMs may be two or may be four or greater. For example, when the number of the active station VMs is four, the number of the disaster recovery station VMs is also four, that is, the same as the number of the active station VMs.

6. Others

Figure 13:
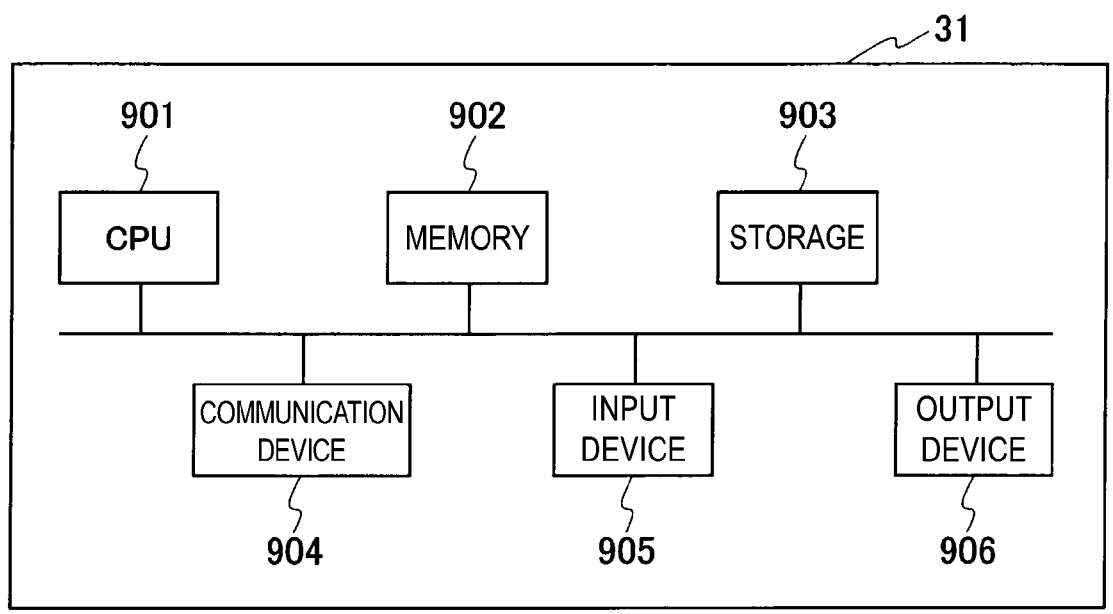
FIG. 13 is a diagram illustrating an example of a hardware configuration of the extra call control apparatus.

The present invention is not limited to the embodiment described above. The present invention can be variously modified within the scope of the gist of the present invention. The IA server 31 (that is, the call control apparatus) includes, for example, a central processing unit (CPU, a processor) 901, a memory 902, a storage 903 (a hard disk drive (HDD), a solid state drive (SSD)) 903, a communication device 904, an input device 905, and an output device 906 (see FIG. 13). The memory 902 and the storage 903 are storage devices. Each function of the call control apparatus is realized by the CPU 901 executing a predetermined program loaded on the memory 902. A program for the call control apparatus may be stored in a computer-readable recording medium such as an HDD, an SSD, a universal serial bus (USB) memory, a compact disc (CD), and a digital versatile disc (DVD). The program for the call control apparatus may also be distributed via a communication network.

REFERENCE SIGNS LIST

1: Call control system
11A: IA server (active station)
11B: IA server (active station)
11C: IA server (active station)
31: IA server (disaster recovery station)
32: External disk
311A: Execution unit
311B: Execution unit
311C: Execution unit
312: Control unit
901: CPU
902: Memory
903: Storage
904: Communication device
905: Input device
906: Output device

The invention claimed is:

1. A call control apparatus that operates as an extra call control apparatus inside of one hardware apparatus, comprising:
  one or more processors configured to:
    execute respective virtual machines of a plurality of disaster recovery stations corresponding one-to-one to a plurality of active stations including a call control server configured to perform call processing at normal times, the plurality of disaster recovery stations including a virtualized call control server configured to perform call processing when an active station of the plurality of active stations is not operating; and
    control an operation of the virtual machines of the plurality of disaster recovery stations, wherein the one or more processors are further configured to activate, at normal times, the virtual machines of the plurality of disaster recovery stations corresponding one-to-one to the plurality of active stations inside of the one hardware apparatus, deactivate, when any active station of the plurality of active stations is not operating, a virtual machine of a disaster recovery station of the plurality of disaster recovery stations other than a virtual machine of a disaster recovery station of the plurality of disaster recovery stations corresponding to the active station not operating, and operate only the virtual machine of the disaster recovery station corresponding to the active station not operating, and at normal times, each of the virtual machines of the plurality of disaster recovery stations configured to repeatedly receive data related to call processing from a corresponding active station of the plurality of active stations at a predetermined timing, wherein the virtual machine of the disaster recovery station includes a plurality of pairs of call control servers in a cluster configuration including a virtualized active system call control server and a virtualized standby system call control server.

2. The call control apparatus according to claim 1, wherein the one or more processors are configured to allocate, at normal times, a predetermined amount of available resource to each of the virtual machines of the plurality of disaster recovery stations, release, when an active station of the plurality of active stations is not operating, an amount of available resource allocated to the virtual machine of the disaster recovery station other than the virtual machine of the disaster recovery station corresponding to the active station not operating, and increase an amount of available resource to be allocated to the virtual machine of the disaster recovery station corresponding to the active station not operating.

3. A call processing continuation method performed by an extra call control apparatus that operates inside of one hardware apparatus, the extra call control apparatus including:

one or more processors configured to:

execute respective virtual machines of a plurality of disaster recovery stations corresponding one-to-one to a plurality of active stations including a call control server configured to perform call processing at normal times, the plurality of disaster recovery stations including a virtualized call control server configured to perform call processing when an active station of the plurality of active stations is not operating; and control an operation of the virtual machines of the plurality of disaster recovery stations, the call processing continuation method comprising:

activating, at normal times, the virtual machines of the plurality of disaster recovery stations corresponding one-to-one to the plurality of active stations inside of the one hardware apparatus;

by each of the virtual machines of the plurality of disaster recovery stations, repeatedly receiving, at normal times, data related to call processing from a corresponding active station of the plurality of active stations at a predetermined timing; and deactivating, when any active station of the plurality of active stations is not operating, a virtual machine of a disaster recovery station of the plurality of disaster recovery stations other than a virtual machine of a disaster recovery station of the plurality of disaster recovery stations corresponding to the active station not operating, and operating only the virtual machine of the disaster recovery station corresponding to the active station not operating, wherein the virtual machine of the disaster recovery station includes a plurality of pairs of call control servers in a cluster configuration including a virtualized active system call control server and a virtualized standby system call control server.

4. A non-transitory computer readable medium program, causing a computer to operate as the call control apparatus according to claim 1.

5. A non-transitory computer readable medium program, causing a computer to operate as the call control apparatus according to claim 2.

* * * * *